United States Patent [19]

Tiffany

[11] Patent Number: 5,484,617
[45] Date of Patent: Jan. 16, 1996

[54] PROCESS FOR PREPARING GOLDEN YELLOW POTATO PIECES AND PRODUCT THEREOF

[75] Inventor: Linda E. Tiffany, Ontario, Oreg.

[73] Assignee: Ore-Ida Foods, Inc., Ontario, Oreg.

[21] Appl. No.: 373,458

[22] Filed: Jan. 17, 1995

Related U.S. Application Data

[63] Continuation of Ser. No. 164,709, Dec. 10, 1993, abandoned.

[51] Int. Cl.$^6$ ............................................. A23L 1/216
[52] U.S. Cl. .................... 426/250; 426/262; 426/438; 426/441; 426/637
[58] Field of Search .................... 426/250, 262, 426/438, 441, 637, 808

[56] References Cited

U.S. PATENT DOCUMENTS

| | | |
|---|---|---|
| Re. 27,531 | 12/1972 | Murray et al. . |
| 2,789,056 | 4/1957 | McColm et al. ................... 426/250 |
| 3,424,591 | 1/1969 | Gold . |
| 3,751,268 | 8/1973 | Van Patten et al. . |
| 4,204,043 | 5/1980 | Shultz ................... 426/267 |
| 4,380,553 | 4/1983 | Schmidt ................... 426/250 |
| 4,414,234 | 11/1983 | Screenivasan et al. ................... 426/540 |
| 4,542,030 | 9/1983 | Haury et al. ................... 426/262 |
| 4,632,834 | 12/1986 | Barnes ................... 426/262 |

FOREIGN PATENT DOCUMENTS 1034747  7/1966  United Kingdom ................... 426/250

*Primary Examiner*—Arthur L. Corbin
*Attorney, Agent, or Firm*—Burns, Doane, Swecker & Mathis

[57] ABSTRACT

The present invention relates to a process for preparing frozen potato products, wherein raw potatoes are cut into a desired shape. The particular improvement which comprises the present invention is the added step of passing the potato pieces through an aqueous solution of food grade color, i.e. annatto or yellow dye. Such treatment provides potato pieces having a light golden yellow color upon emerging from said color solution. The colored pieces may then be additionally cooked and frozen for packaging and sale. Final preparation for consumption of the pieces is by reheating for a few minutes in an oven or deep frying.

17 Claims, No Drawings

PROCESS FOR PREPARING GOLDEN YELLOW POTATO PIECES AND PRODUCT THEREOF

This application is a continuation, of application Ser. No. 08/164,709, filed Dec. 10, 1993, now abandoned.

FIELD OF THE INVENTION

This invention relates to a process for preparing frozen potato products, and more particularly to an improved French fry product having a brighter, more golden color.

BACKGROUND OF THE INVENTION

French fried potatoes have long been popular as a convenience food, particularly potatoes which have been frozen and may be easily re-heated. Various methods have been proposed for preparing such products so that they have a pleasing appearance as well as their unique taste appeal. Desirably, to achieve such appearance of the prepared pieces requires that they have a golden brown highlighting and a satisfactory golden color.

Attempts have been made to produce such coloring without overcooking, since prolonged cooking requires added heat and dwell time, which may result in excessive loss of water, thereby concentrating "solids" in the product.

One such method for preparing potato pieces is disclosed in U.S. Pat. No. 4,542,030, issued to Haury et al. Such previous methods include using a combination of sodium acid pyrophosphate (SAPP) and caramel, together with adequate glucose or other sugars, so that after the potato pieces have been prepared and partially cooked, as by immersion in a heated water bath or steamed, the surface of the potato pieces will absorb adequate sugar prior to cooking in vegetable oils. This allows the pieces to develop the desired color through a combination of caramel coloring and caramelization of the sugar content.

Unfortunately, with such an arrangement the brown highlighted coloring most desirable for the surface appearance of the potato pieces may require prolonged cooking to fully develop a desired golden yellow color. Such extended cooking tends to increase the solids content of the finished par-fried pieces. It also results in additional cost due to the longer processing time and heat required to color the particles properly. Further, the color so developed may be affected by the state of maturity or "ripeness" of the potatoes, their storage conditions, and their sugar content. Each of these factors can significantly alter the final color of the cooked potato strips.

On the other hand, if the potato pieces are not cooked to a consistent color, the appearance of edible product will not be consistently golden brown after final cooking As shown in U.S. Pat. No. 3,424,591, issued to Gold, et al., other methods of affecting the coloring of French fried potatoes pieces may include dipping the partially cooked potato pieces in non-ionic alkylcellulose ether, such as hydroxypropylmethyl cellulose, or carboxymethyl-cellulose, generally designated as an aqueous hydrocolloid solution. This coating inhibits natural browning. The primary purpose of the hydrocolloid disclosed in this patent is to form a viscous coating to prevent penetration of oil during the subsequent cooking period.

U.S. Pat. No. Re 27,531, issued to Murray et al. discloses treating potato products from reconstituted raw potatoes or sliced raw potatoes. Prior to cooking in hot edible cooking oil, potato pieces are dipped in an amylose coating. The amylose starch fraction is used as the coating product because it produces improved appearance, texture and taste when it is used to coat potato products prior to deep frying.

U.S. Pat. No. 3,751,268, issued to Van Patten et al. likewise is directed to the use of a coating containing a high percentage of amylose starch. In this process, the amylose coating is an aqueous solution which may also contain sugar, dextrose and sodium acid pyrophosphates. The coating takes place before deep frying.

SUMMARY OF THE INVENTION

The present invention relates to a process for preparing frozen potato products, wherein raw potatoes are optionally peeled, and cut into a desired shape. The particular improvement which comprises the present invention is the added step of passing the potato pieces through an aqueous solution of food grade color. Such treatment provides potato pieces having a light golden yellow color upon emerging from said color solution. The colored pieces may then be additionally cooked and frozen for packaging and sale. Final preparation for consumption of the pieces is by reheating for a few minutes in an oven or deep frying.

DETAILED DESCRIPTION OF THE INVENTION

This invention relates to a method of preparing frozen partially cooked, or par-fried, potato strips, fries or chips having a uniform bright golden color produced by a food grade coloring solution. These potato pieces maintain this coloring through further cooking (such as par-frying) and heating or reconstitution. Optionally, reducing sugars may be added to the color solution to produce golden brown highlights on the potato pieces. The method develops bright golden highlights on potato pieces, without requiring excessive cooking time or temperature, and thereby improves product production, both as to increased yield of product and reduced cost of processing.

It is a particular object of the invention to prepare raw potato pieces in a conventional manner by optionally peeling and cutting potatoes into desired shapes suitable for partial cooking in a water bath or steam chamber in order to swell and gelatinize the potato starch over exposed surfaces of pieces. However, as distinguished from the prior art, the pieces are then immersed in a new color system, comprising an aqueous solution of food grade color.

It has also been found that these aqueous solutions may be used to color raw potato pieces, e.g., potato pieces which have not been partially cooked in a water bath or steam chamber.

Any appropriate food grade color may be used. Preferred food grade colors will provide an acceptable color, based on processor and consumer preferences. Preferred food grade colors will be inexpensive enough to be cost effective. Food grade colors of natural origin may be preferred, although some may be cost prohibitive. The food grade color used should be water soluble for easy application to the potato pieces in aqueous solution, yet the color must not leach out of the pieces during subsequent steps when the pieces may be par-fried or otherwise cooked in oil. An additional consideration for selecting an appropriate food grade color is the taste that such color may also impart. Preferred food grade colors include annatto, blends of annatto, F.D. Yellow No. 5, F.D. Yellow No. 6, beta carotene, and turmeric. Most preferred for use in the present invention are annatto or blends of annatto.

Annatto is an edible, non-carcinogenic, natural coloring agent which is widely available at low cost. Annatto and blends of annatto are commercially available. For example, Annatto Food Color—Water Soluble 2X (Chr. Hansen's Laboratory, Inc. Milwaukee, Wis.) is suitable for use in the present invention. This product is a water soluble, alkaline based color with 2.7% color strength (measured as % norbixin).

In particular, it has been found that aqueous solutions of food grade annatto (about 2.70 % norbixin) at concentrations of from about 0.02% to 0.50% by weight may be used in the present invention. These concentrations provide an orange-yellow color solution which is readily absorbed by the gelatinized surfaces of the potato pieces when they are passed through the solution. The exact concentration of the solution of annatto depends on the color strength (as measured by % norbixin) of the annatto used and the final color desired. As will be discussed later, the concentration of color used may also depend on the desired temperature of the solution and the desired dwell time of the potato pieces in the solution. In particular, at a temperature of about 130°–180° F. and a dwell time of about 5–30 seconds, solutions of from about 0.02–0.12 wt % annatto (about 2.70% norbixin) are more preferred for use in the present invention. A temperature of about 165° F. is most preferred.

The temperature of the aqueous color solution may range from ambient or cold tap water temperatures to about 200° F. However, using cold water would require a longer dwell time of the potato pieces in the solution in order to obtain suitable color absorption. On the other hand, water over 180° F. would require more frequent replacement of color to the solution. Each of these conditions would be more costly than the preferred temperatures of about 130°–180° F. and dwell times of about 5–30 seconds.

In general, the concentration of food grade color, temperature of solution, and dwell time may be varied depending on the particular food grade color used and the potato color desired.

Optionally, a reducing sugar such as dextrose, arabinose, fructose, galactose, mannose, maltose, lactose or cellobiose may be added to the color solution. Such reducing sugars will provide extra flavor and brown highlights from carmelization during the cooking steps following immersion in the food grade color solution. Such sugars may be used at concentrations of from about 0.25–3.00 wt %. Levels of sugar which are too high may produce acridity and sharp off flavors on the surface of the final reconstituted product. In a preferred embodiment, dextrose at a concentration of about 0.25–1.50 wt % may be added to the aqueous food grade color solution. This level is lower than in prior coloring solutions because only portions of the surface of each piece require the brown highlights generated in subsequent deep frying.

Potato strips or pieces recovered from the color solution have a light golden color and are suitable for further cooking. Upon deep frying, or spraying with hot oil and baking, the color turns to a deeper golden yellow color and, depending upon the content of any reducing sugar which may be used, develops desirable golden brown highlights on each piece. Such coloring gives a particularly appealing appearance and flavor to the final potato product.

After removing the pieces from the color solution, they may, optionally, be dried in heated air at about 100°–220° F. for about 1–5 minutes before further cooking. In a preferred method, the colored pieces may be dried at about 100°–180° F. for about 1–5 minutes.

After the potato pieces have been dipped in the color solution, they will be further cooked by, for example, par-frying. It has been found that the use of the color solutions of the present invention provide a potato product which requires less par-frying time and lower par-frying temperatures. Preferably, potato pieces may be par-fried at about 270°–390° F. in food grade oil. More preferably, pieces are par-fried at about 330°–375° F. and, most preferably, at about 345°–365° F.

The par-frying time varies with the size and shape of the potato pieces, as well as with the final color desired. For crinkle cut potato pieces, using the methods of the present invention, par-fry times of about 40–100 seconds are used. Larger pieces may take up to about 120–150 seconds.

High temperature par-frying and/or par-frying for longer times reduces oil quality. Poor quality oil produces a dull product and off flavors. Thus, the present invention, by reducing par-frying time and temperature, extends the life of the oil used for par-frying.

As an example of the advantages of the present invention, it has been found that crinkle cut potato pieces prepared using conventional techniques require 70–90 seconds par-frying time at 375°–380° F., while crinkle cut potato pieces which have been prepared using food grade color solutions according to the present invention require only 55–60 seconds par-frying at 345°–360° F.

The finished potato pieces recovered from cooking at such temperatures and times display a generally golden color which is particularly characterized by the brown highlights on the edges of the potato pieces. Additionally, at such shortened cooking times, the golden colored potato pieces have a lower level of total solids and a lower concentration of residual cooking oil, which represents cost savings to the processor. Using conventional techniques, the colored parfried or otherwise cooked potato pieces are then cooled and frozen for packaging. Such pieces are suitable for reconstitution by baking or deep frying.

Final color is the critical control point. If long cooking is needed to provide acceptable final color, the total solids content of the potato pieces will rise. This increases processing costs. Using conventional techniques, obtaining optimum color without increasing total solids is quite difficult. The present invention provides a simple, reliable method to achieve desired color while controlling total solids.

The present invention is particularly directed to the problem of generating potato pieces which are uniform in color and color intensity from potatoes which vary considerably in time in storage, color, maturity, sugar, and solid content. I have found that an aqueous food grade color solution is highly effective to generate a desired color that remains through further cooking. In particular, annatto is preferably used in such color solutions.

While the invention has been described primarily in terms of French fried potato pieces, it will be apparent to those skilled in the art that such unique coloring technique has equal value in preparing and cooking potato chips, that is, slices of a few hundreds of an inch thick, hash-brown-style potatoes, shoe-string potatoes, potato pancakes and many other forms of potatoes, whether prepared from raw potatoes or reconstituted from mashed potatoes extruded into other desired configurations or forms.

It will be apparent that various modifications and changes can be made both in the processing and in the relative amounts of the preferred ingredients to prepare cooked potato pieces or French fried potato strips for freezing and marketing thereof, without departing from the scope of the invention set forth in the claims. All such modification or changes coming within the terms of the claims are intended to be included therein.

I claim:

1. A method for preparing potato products, consisting essentially of:
   a) optionally peeling potatoes;
   b) cutting or shaping said potatoes into pieces of desired shape; and
   c) passing said potato pieces through an aqueous solution of food grade color wherein said food grade color is selected from the group consisting of annatto and blends of annatto, to thereby provide potato pieces having a light golden yellow color upon emerging from said color solution.

2. The method of claim 1 further comprising the step of, after step b), partially cooking said cut or shaped potato pieces in a water bath or a steam chamber so as to swell and partially gelatinize the potato starch in said potato pieces before passing said pieces through said aqueous solution of food grade color.

3. The method of claim 1 wherein the temperature of said aqueous solution is about 130°–180° F.

4. The method of claim 1 wherein the dwell time of said potato pieces in said aqueous solution is about 5–30 seconds.

5. The method of claim 1 wherein said aqueous solution further comprises at least one reducing sugar selected from the group consisting of dextrose, arabinose, fructose, galactose, mannose, maltose, lactose and cellobiose.

6. The method of claim 5 wherein said reducing sugar is dextrose.

7. The method of claim 6 wherein the concentration of dextrose in said aqueous solution is about 0.25–1.50 wt %.

8. The method of claim 1 wherein the concentration of annatto in said aqueous solution is about 0.02–0.50 wt % annatto (about 2.70 % norbixin).

9. The method of claim 8 wherein said annatto concentration is about 0.02–0.12 wt %.

10. The method of claim 1 further comprising the step of additionally cooking said potato pieces.

11. The method of claim 10 wherein said additional cooking is par-frying.

12. The method of claim 11 wherein said par-frying is at about 270°–390° F.

13. The method of claim 10 further comprising, before said additional cooking step, the step of drying said potato pieces.

14. The method of claim 13 wherein said drying is by placing said potato pieces in hot air at about 100°–220° F. for about 1–18 minutes.

15. A method of preparing potato products consisting essentially of:
   a) optionally peeling potatoes;
   b) cutting or shaping said potatoes into pieces of desired shape;
   c) partially cooking said cut or shaped potato pieces in a water bath or a steam chamber so as to swell and partially gelatinize the potato starch in said potato pieces;
   d) passing said partially cooked potato pieces through an aqueous solution comprising, about 0.02–0.12 wt % food grade annatto (about 2.70 % norbixin) and about 0.25–1.50 wt % dextrose, at a temperature of about 130°–180° F. for a time period of about 5–30 seconds to thereby provide potato pieces having a light golden yellow color upon emerging from said color solution;
   e) drying said colored potato pieces in air at a temperature of about 100°–180° F. for about 1–5 minutes;
   f) par-frying said dried and colored potato pieces in food grade oil at temperature of about 345°–365° F. for a period of about 40–100 seconds;
   g) draining said par-fried potato pieces of excess cooking oil; and then
   h) freezing and packaging said potato pieces.

16. A prepared potato product consisting essentially of potato pieces which have been optionally peeled, then cut or shaped, and then passed through an aqueous solution of food grade color wherein said food grade color is selected from the group consisting of annatto and blends of annatto, to thereby provide potato pieces having a light golden yellow color upon emerging from said color solution.

17. The prepared potato product of claim 16 wherein said cut or shaped potato pieces are partially cooked in a water bath or a steam chamber so as to swell and partially gelatinize the potato starch in said potato pieces before said pieces are passed through said aqueous solution of food grade color.

* * * * *